Patented Oct. 1, 1935

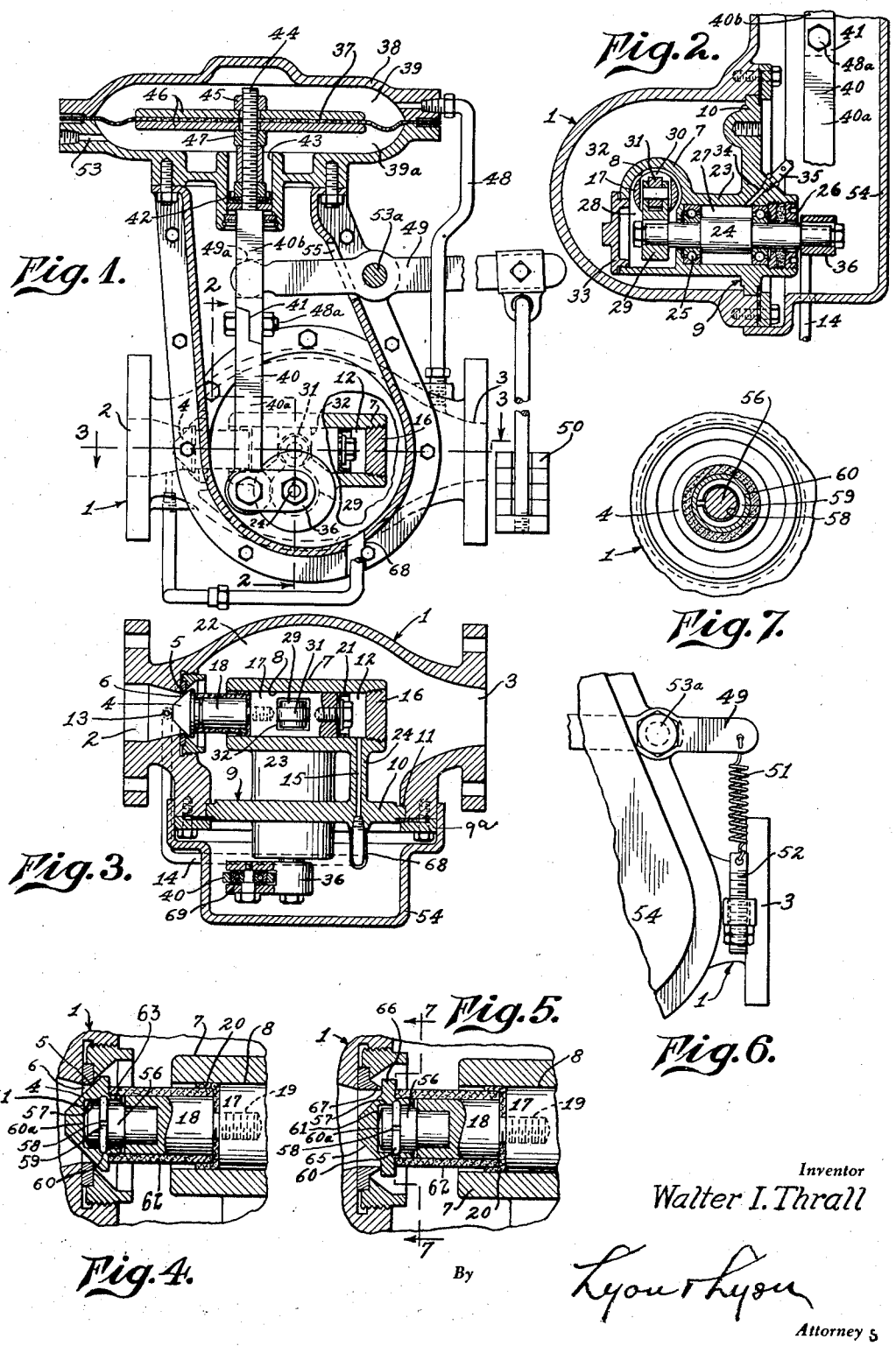

2,015,977

UNITED STATES PATENT OFFICE 2,015,977

PRESSURE REGULATOR

Walter I. Thrall, Alhambra, Calif., assignor, by mesne assignments, to Reliance Regulator Corporation, Alhambra, Calif., a corporation of California Application November 6, 1931, Serial No. 573,379

6 Claims. (Cl. 50—27)

This invention relates to pressure regulating apparatus, and particularly to a pressure controlled reducing valve. While the invention is applicable to valves used for controlling fluids of any kind, in the present specification, the invention is described as applied to a pressure regulator for gas. These regulators are used in gas lines so as to deliver gas received at a relatively high pressure, at a lower pressure in a static line or service line. It is necessary to maintain a substantially constant pressure in the static line so that the gas delivered to the consumer's burners will burn under substantially constant pressure.

Heretofore, it has been the practice to employ a balanced valve having two valve disks cooperating with two valve seats, but this construction is very difficult to maintain the effective closing of both of the valve openings. The heads of the valve disks are rigidly connected together by a stem, and the valve seats must be precisely the same distance from each other as the valve disks. Any slight unequality in either of the valve seats, or any undue wear occasioned by the use of the valve will immediately prevent one or the other of the valve disks from seating properly on its seat; in other words, such a valve in a short period of service is apt to leak at one of its seats. The pressure regulation of such valves has usually been accomplished heretofore by means of a pressure actuated diaphragm with connecting parts that connect it to the valve so that as the pressure in the static line falls, the valve will automatically be moved to a further opened position. In this way, these valves operate automatically to maintain a substantially constant static pressure in the static line in spite of wide variations in the amount of gas being consumed in the line. As usually constructed, the mechanism connecting the pressure controlled member with the valve requires considerable force to operate the valve. Furthermore, the working parts for operating the valve are usually subjected to contact with the gas which is apt to corrode them, and thereby impair their usefulness.

The general object of this invention is to produce a valve of this kind, which, tho balanced, avoids the necessity of using two disk closures, that is to say, a valve that provides a single seat and a single valve closure cooperating with a seat.

A further object of the invention is to provide a construction which enables the valve and the actuating parts immediately associated with it to be readily removable.

A further object of the invention is to provide a construction which will enable the working parts immediately associated with the valve to be enclosed in such a way that they can be readily maintained in a lubricated condition, and so that they will be out of contact with the gas that flows through the valve. In valves of this kind, a closure is usually guided to slide toward or from the valve seat, and one of the difficulties in attaining effective closing of the valve is to maintain perfect alinement between the line of travel of the valve and the axis of the seat. Any faults in alinement tend to produce a leaky valve when closed. One of the objects of the invention is to overcome this difficulty and to provide a construction for the valve which will enable the valve closure or valve head to adapt itself to the seat.

Further objects of the invention will appear hereinafter.

The invention consists of novel parts and combinations of parts to be described hereinafter, all of which contribute to produce an efficient pressure regulator.

A preferred embodiment of the invention is described in the following specification, while the broad scope of the invention is pointed out in the appended claims.

In the drawing—

Figure 1 is a vertical section taken through the valve and passing through the removable cover of the casing, certain parts being broken away, and shown in section;

Figure 2 is a vertical section taken about on the line 2—2 of Figure 1, and particularly illustrating the actuating parts immediately connected with the valve for moving it toward or from its seat, and illustrating the construction which I employ to prevent the gas from coming into direct contact with them or their bearings; this view is a fragmentary view and certain parts are broken away;

Figure 3 is a horizontal section taken about on the line 3—3 of Figure 1, and passing through the valve head and valve seat; this view further illustrates details of the arrangement of the actuating mechanism for controlling the position of the valve, and a means for effecting the balancing of the valve;

Figure 4 is a fragmentary view and is a section through the valve and valve seat in the same plane as Figure 3; this view is upon an enlarged scale and illustrates a portion of the guiding means for guiding the valve to and from its seat;

Figure 5 is a view similar to Figure 4, but illustrating another type of valve seat that I may employ;

Figure 6 is a fragmentary side elevation and illustrating another means for counterbalancing the weights of the moving parts of the valve and involving the use of a spring instead of weights as illustrated in Figure 1;

Figure 7 is a vertical cross-section taken on the line 7—7 of Figure 5 and particularly illustrating the means for attaching the valve head to enable it to adapt itself to the valve seat when it comes upon it.

Referring more particularly to the parts, 1 indicates a valve casing having an inlet 2 at one side where the fluid or gas under relatively high pressure is received, and having an outlet 3 which is to be connected to the static line in which a substantially constant pressure is to be maintained by the automatic action of the valve 4 cooperating with its seat 5 so as to close more or less the valve opening 6 through the seat. Within the casing, I provide guiding means 7 for guiding the valve and this guiding means is preferably in the form of a cylinder having a bore 8 in alinement with the axis of the valve. This guide is preferably carried on a movable member 9, which, in the present instance, is in the form of a base member or inner cover plate 10 of circular form received on an annular shoulder 11 at the front of the casing. The rear end of valve 4 is guided in the bore 8, and at the remote end of the bore with respect to the valve, I provide a balancing chamber 12 to which gas under the relatively high pressure is admitted from the small orifice 13 at the inlet 2. From this point, gas is taken off through a pipe connection 14 and introduced to the balancing chamber 12 through a drilled passage 15 to which the end of the pipe 14 is connected. The rear end of the cylinder 7 is closed by a suitable gas-tight plug 16.

Within the cylinder, a piston 17 is mounted to slide freely and the forward end of this piston is connected by an extension or block 18 to the valve head 4. This connection will be described more in detail hereinafter. As illustrated, this extension or block 18 may be attached to the adjacent end of the piston by means of a stud 19 carried on the block, and the piston is made gas-tight at this end by means of suitable packing, such as a cup-leather 20. At the other end of the piston, a similar cup-leather 21 is provided. The cup-leather 20, of course, prevents gas in the valve chamber 22 within the casing from leaking along the side face of the piston 17. This is to prevent the gas within the valve casing from having access to the working parts and particularly the bearings of the working parts that move the piston 17 to and fro in regulating the position of the valve 4. The cup-leather 21, of course, prevents the gas in the balancing chamber 12 from gaining access to these working parts. The cylinder 7 is preferably made as a casting connected integrally by a neck 23 to the plate 10, and, if desired, a smaller neck 24 can be provided connecting these parts to carry the passage 15 already described. With this organization of parts, it will be evident that if the plate 10 is removed it will carry with it the valve and piston 17. It would also carry with it the actuating parts for the valve which are immediately associated with the piston and these parts are mounted in the neck 23 so as to prevent their contact with the gas flowing through the valve. In order to accomplish this, I provide a rock-shaft 24 mounted in the tubular neck 23 (see Figure 2) preferably by means of suitable ball bearings 25. The outer end of this shaft projects through the disk or circular plate 10, and is suitably packed by a stuffing box 26 to prevent gas from passing into the chamber 27 which surrounds the rock-shaft and which communicates at 28 with the interior of the cylinder 7 through the medium of a large slot. At this slot a short arm 29 attached to the rock-shaft extends upwardly into a socket or slot 30 cut vertically through the piston and at this point a roller 31 may be provided to roll against the vertical side faces 32 of this slot or socket 30. The inner end of the chamber 27 is closed by a gas-tight plug 33, and the chamber 27 at a suitable point is provided with a grease passage 34 to which a fitting 35 may be attached to enable the chamber to be charged with grease under pressure. The grease not only fills the chamber 29, but will force its way through the inner ball bearing 25 and fill the end of the chamber which connects with the bowl of the cylinder, thereby lubricating the piston and the roller 31.

The arm 29 of the rock-shaft preferably projects upwardly in a substantially vertical position. The rock-shaft is provided with an actuating arm 36 which preferably extends in a general horizontal direction. This arm is located on the outer side of the plate 10, and is connected by any suitable means to a pressure controlled member such as a diaphragm 37. This diaphragm is preferably mounted in a suitable casing 38 having a pressure chamber 39 on one side of the diaphragm and an air chamber 39a on the other side. The pressure chamber 39 is preferably on the upper side so that an increase of pressure in this chamber will tend to move the valve toward its seat. The connection from the actuating member 37 is preferably accomplished by the medium of a connecting rod 40 and the construction is such as to enable this rod to be readily disconnected to permit the plate 10 to be removed (carrying the valve and its working parts). For this purpose, the connecting rod 40 is preferably formed in two sections 40a and 40b connected together by a scarf joint 41, the upper end of section 40b being attached to a piston 42 fitting loosely in a guide bore 43 and mounted on a threaded stem 44 that passes through the center of the diaphragm 37 which carries a nut 45 to tighten the clamping disks 46 of the diaphragm. Between the piston 42 and the lower disk 46 a thimble or distance piece 47 is provided against which the lower clamping disk 46 thrusts when the nut 45 is tightened up. The pressure at the outlet 3 is communicated to the pressure chamber 39 through a suitable pipe connection 48.

At the scarf joint 41, a disconnectible bolt 48a is provided and above this joint a counterbalancing lever 49 is provided with a rounded head received in a slot 49a in the upper section 40b of the connecting rod. The outer arm of this lever is either counterweighted or provided with a spring which counterbalances more or less the weight of the diaphragm disks 46 and the connecting rod and other parts connected with them. In Figure 1, counterbalancing weights 50 are illustrated, but in Figure 6, I illustrate the use of a spring 51 instead of these weights. The amount of weight in the counterbalance when used in the construction illustrated in Figure 1 can be altered by changing the number of the weights 50. In the construction shown in Figure 6, the effect of the counterbalance can be changed by adjustment of a threaded bolt 52 with which the end of the spring is hooked.

The air chamber 39a is connected to the atmosphere through a suitable air vent 53a.

In taking apart the mechanism of the valve by removing the pivot bolt 53a that supports the counterbalancing lever 49, this lever can be disengaged from the casing. The plate 9 is clamped on its seat by a clamping ring 9a. This cover is provided with a slot 55 in its wall through the lever passes.

In order to insure effective closing of the valve 4 against its seat 5, I prefer to attach the valve to the block 18 in such a way as to permit a slight wobbling movement of the valve as it comes onto its seat. This construction is illustrated in detail in Figures 4, 5, and 7. In order to accomplish this, I provide the forward end of the block 18 with a valve carrier having a forwardly projecting shank 56 which fits loosely in a bore 57 in the rear face of the valve head 4. Between the bore 57 and the side face of the shank 56, a circumferential groove 58 is formed into which a resilient ring or spring ring 59 is received. This ring is a split ring. It exerts a slight outward thrust against the face of the bore, and is preferably received in a slight annular depression or recess 60 formed in the bore, thereby enabling the split ring to retain the head on the shank, but at the same time permitting slight wobbling or lateral movement. In order to enable the valve to move freely laterally to accommodate its position to the opening in the seat, I prefer to form the shank 56 with a convexly curved end face 56a which seats against the flat bottom face 61 of the bore 57. This enables the piston to exert a thrust against the valve head effectively to close the valve.

The valve is held yieldingly in an alining position. A sleeve 62 of yielding material envelops the block 18 and extends over a tubular shank 63 that extends back from the valve head to keep foreign matter out of the joint. The forward end of the sleeve 62 may lie close against the rear face 64 of the valve.

In the embodiment of the valve shown in Figure 5, the construction for carrying the valve is the same as that illustrated in Figure 4, but the valve is of slightly different form, that is, the conical face 65 of the valve does not come against the seat, but the valve is provided with an annular flange 66, the forward face of which comes against a knife edge seat 67.

In order to enable the cover 54 to be applied or taken off without interfering with the pipe connection 14, the lower edge of the cover is provided with a deep notch 68 (see Figure 3).

In order to reduce the friction and make the valve more sensitive in its operation, the lower end of the connecting rod 40 is connected to the long arm 36 of the rock-shaft by means of a ball bearing 69 (see Figure 3).

The weights 50, would be sufficient to completely counterbalance the weight of the connecting rod and the parts connected with it and to support the pressure in chamber 39. The amount of weights employed or the adjustment of the spring 51 determines the static pressure in the static line to which the outlet 3 of the valve delivers the gas.

In the operation of the apparatus, if the pressure in the static line arises for any reason, for example, by a reduction in the consumption of gas, this rise in pressure is communicated to the pressure chamber 39, and the force pressing down on the upper face of the diaphragm will increase, thereby causing a downward movement of the connecting rod 40 and a consequent movement of the valve 4 toward its seat; in other words, this would cause the valve to move so as to reduce its effective opening. On the other hand, if the pressure falls in the static line for any reason, this fall in pressure will be communicated to the pressure chamber 39, and the counterweights 50 applied on lever 49 will cause the connecting rod 40 to move upwardly thereby further opening the valve.

By reason of the fact that the bearings 25 for the rock-shaft 24 are enclosed and out of contact with the gases, they are not subject to such corrosion, which causes difficulties in the continued use of pressure regulating apparatus as usually constructed. Furthermore, as these bearings are ball bearings, and the bearing 69 is also a ball bearing, it requires very little change of pressure in the chambers 39 to cause a movement of the valve. In this way, I produce a valve which is very sensitive in operation.

The flexible connection between the valve head 4 and the shank 56 on which it is mounted enables the valve to adapt itself nicely to its seat insuring that the valve when closed will not leak.

The valve seats illustrated in Figures 4 and 5 may be made of any suitable composition.

It is understood that the embodiment of the invention described herein is only one of the many embodiments this invention may take, and I do not wish to be limited in the practice of my invention, nor in my claims, to the particular embodiment set forth.

What I claim is:

1. In a reducing valve, the combination of a casing having a valve-seat and opening therein for admitting a fluid, a valve seating at the said opening, guiding means for the valve in the form of a cylinder at the rear end of the valve, a base member carrying the cylinder and removably mounted on the casing, a rock-shaft mounted in the said base member and having an arm connecting with the valve to move the same toward or from its seat, a pressure-controlled member with a pressure chamber adjacent to the same, and a disconnectible connection from the pressure controlled member to the rock-shaft and operating when disconnected to permit the base member and valve to be removed.

2. In a reducing valve, the combination of a casing having a valve-seat and opening therein for admitting a fluid, a valve seating at the said opening, guiding means for the valve in the form of a cylinder at the rear end of the valve, a base-member in the form of a cover-plate removably mounted in the side of the casing, and carrying the cylinder, a rock-shaft mounted in the said base-member and having an arm within the casing connecting with the valve to move the same toward or from its seat, a pressure controlled member with a pressure chamber adjacent to the same and a disconnectible connection from the pressure-controlled member to the rock-shaft and operating when disconnected to permit the base-member and valve to be removed.

3. In a reducing valve, the combination of a casing having a valve-seat and opening therein for admitting a fluid, a valve seating at the said opening, guiding means for the valve in the form of a cylinder at the rear end of the valve, a base-member in the form of a circular plate removably mounted in the side of the casing, and carrying the cylinder, a rock-shaft mounted in the said base-member having an arm connecting with the valve to move the same toward or from its seat and having an actuating arm on the outer side of the circular plate, a pressure-controlled member with a pressure chamber adjacent to the same, and a connecting rod connecting the pressure-controlled member to the second named arm of the rock-shaft.

4. In a reducing valve, the combination of a valve seat, with an opening therein for admitting a fluid, a valve seating at the said opening, a guide cylinder at the back of the valve with a piston movably mounted therein and connected with the valve, said cylinder having a balancing chamber at the rear end of the piston remote from the valve, a member carrying said cylinder and having a closed chamber communicating with the interior of the said cylinder, a rock-shaft with bearings for the same in the said closed chamber, and having an arm projecting into the cylinder and engaging the piston to enable the rock-shaft to move the piston to and fro to regulate the position of the valve with respect to its seat, pressure-controlled means, and means connecting the same with the rock-shaft outside of the said closed chamber.

5. In a reducing valve, the combination of a casing having a valve-seat and opening therein for admitting a fluid, a valve seating at the said opening, a guide cylinder at the back of the valve with a piston movably mounted therein and connected with the valve, said cylinder having a balancing chamber at the rear end of the piston remote from the valve, a member carrying said cylinder and having a closed chamber communicating with the interior of the said cylinder, a rock-shaft with bearings for the same in the said closed chamber, means connecting the rock-shaft with the piston to enable the rock-shaft to move the piston to and fro to regulate the position of the valve with respect to its seat, pressure controlled means, and means connecting the same with the rock-shaft for actuating the rock-shaft, said cylinder being located in the path of the fluid passing through the said casing, said piston having fluid-tight packing at its ends preventing the fluid from having access to the bearings in said closed chamber.

6. In a reducing valve, the combination of a casing having a valve-seat and opening therein for admitting a fluid, a valve seating at the said opening, a guide cylinder at the back of the valve with a piston movably mounted therein and connected with the valve, said cylinder having a balancing chamber at the rear end of the piston remote from the valve, a member carrying said cylinder and having a closed chamber communicating with the interior of the said cylinder, a rock-shaft with bearings for the same in the said closed chamber, and having an arm projecting into the cylinder and engaging the piston to enable the rock-shaft to move the piston to and fro to regulate the position of the valve with respect to its seat, pressure-controlled means, and means connecting the same with the rock-shaft outside of the said closed chamber, said cylinder being located in the path of the fluid passing through the said casing, said piston having fluid-tight packing at its ends preventing the fluid from having access to the interior of said closed chamber.

WALTER I. THRALL.